(12) United States Patent
Eronen et al.

(10) Patent No.: US 11,587,202 B2
(45) Date of Patent: Feb. 21, 2023

(54) METHOD, APPARATUS OR COMPUTER PROGRAM FOR CONTROLLING IMAGE PROCESSING OF A CAPTURED IMAGE OF A SCENE TO ADAPT THE CAPTURED IMAGE (71) Applicant: Nokia Technologies Oy, Espoo (FI)

(72) Inventors: Antti Eronen, Tampere (FI); Jussi Leppänen, Tampere (FI); Arto Lehtiniemi, Lempäälä (FI); Kimmo Roimela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 402 days.

(21) Appl. No.: 16/060,128

(22) PCT Filed: Dec. 15, 2016

(86) PCT No.: PCT/FI2016/050879
§ 371 (c)(1),
(2) Date: Jun. 7, 2018

(87) PCT Pub. No.: WO2017/103337
PCT Pub. Date: Jun. 22, 2017

(65) Prior Publication Data
US 2018/0374196 A1 Dec. 27, 2018

(30) Foreign Application Priority Data
Dec. 17, 2015 (EP) .................... 15200926

(51) Int. Cl.
G06K 9/36 (2006.01)
G06T 3/40 (2006.01)
(Continued)

(52) U.S. Cl.
CPC ............ *G06T 3/4038* (2013.01); *G06F 3/017* (2013.01); *G06T 7/50* (2017.01); *G06T 19/006* (2013.01);
(Continued)

(58) Field of Classification Search
CPC ....... G06T 3/4038; G06T 7/50; G06T 19/006; G06K 9/00201; G06K 9/00624; G06K 9/00355; G06K 2009/00738; G06F 3/017
See application file for complete search history.

(56) References Cited

U.S. PATENT DOCUMENTS

2008/0298571 A1* 12/2008 Kurtz ..................... H04N 7/142
379/156
2011/0205242 A1  8/2011 Friesen
(Continued)

FOREIGN PATENT DOCUMENTS

CN  104781779  7/2015
CN  105027030  11/2015
(Continued)

OTHER PUBLICATIONS

Norihiko Kawai et al. "Diminished Reality Considering Background Structures", IEEE International Symposium on Mixed and Augmented Reality pp. 259-260, 2013, Science and Technology Proceedings Oct. 1-4, 2013, Adelaide, SA, Australia.*
(Continued)

*Primary Examiner* — Samir A Ahmed
(74) *Attorney, Agent, or Firm* — Alston & Bird LLP (57) ABSTRACT A method comprising: processing a recording of a scene to recognise a predetermined user command event performed within the scene; and automatically controlling image processing of a captured image of the scene to adapt the
(Continued)

captured image, in dependence on said recognition of the predetermined user command event performed within the scene.

17 Claims, 3 Drawing Sheets

(51) Int. Cl.
    *G06F 3/01*     (2006.01)
    *G06V 20/00*     (2022.01)
    *G06V 20/64*     (2022.01)
    *G06V 40/20*     (2022.01)
    *G06T 7/50*     (2017.01)
    *G06T 19/00*     (2011.01)
    *G06V 20/40*     (2022.01)
(52) U.S. Cl.
    CPC .............. *G06V 20/00* (2022.01); *G06V 20/64* (2022.01); *G06V 40/28* (2022.01); *G06V 20/44* (2022.01)

(56) References Cited

U.S. PATENT DOCUMENTS

| | | | | |
|---|---|---|---|---|
| 2011/0291926 | A1* | 12/2011 | Gokturk | H04N 21/44218 345/158 |
| 2012/0249741 | A1* | 10/2012 | Maciocci | G06F 3/017 348/46 |
| 2013/0050258 | A1* | 2/2013 | Liu | G02B 27/017 345/633 |
| 2014/0055352 | A1 | 2/2014 | Davis et al. | |
| 2014/0147021 | A1* | 5/2014 | Wang | G06F 3/011 382/118 |
| 2014/0240231 | A1 | 8/2014 | Minnen | |
| 2014/0282220 | A1 | 9/2014 | Wantland et al. | |
| 2014/0327679 | A1 | 11/2014 | Cho | |
| 2014/0361988 | A1* | 12/2014 | Katz | G06F 3/016 345/156 |
| 2015/0049113 | A1* | 2/2015 | Rahman | G06T 19/006 345/633 |
| 2015/0054744 | A1* | 2/2015 | Kurzweil | G09B 21/006 345/158 |
| 2015/0117708 | A1* | 4/2015 | Guigues | G06T 7/246 382/103 |
| 2015/0256763 | A1 | 9/2015 | Niemi | |
| 2016/0091964 | A1* | 3/2016 | Iyer | G02B 27/017 345/633 |
| 2016/0239181 | A1* | 8/2016 | You | G06F 3/04815 |

FOREIGN PATENT DOCUMENTS

| | | |
|---|---|---|
| CN | 105074623 | 11/2015 |
| CN | 105122790 | 12/2015 |

OTHER PUBLICATIONS

Jan Herling, "Advanced Self-contained Object Removal for Realizing Real-time Diminished Reality in Unconstrained Environments", IEEE International Symposium on Mixed and Augmented Reality pp. 207-212, 2010, Science and Technolgy Proceedings Oct. 13-16, Seoul, Korea.*

Huidong Bai et al. "Markerless 3D Gesture-based Interaction for Handheld Augmented Reality Interfaces", IEEE International Symposium on Mixed and Augmented Reality 2013 , Science and Technology Proceedings Oct. 1-4, 2013, Adelaide, SA, Australia.*

Wolfgang Hurst et al. "Gesture-based interaction via finger tracking for mobile augmented reality" Springer pp. 233-258, Jan. 18, 2012.*

Mark Billinghurst et al. "Hands in Space Gesture Interaction with Augmented-Reality Interfaces", Computer Graphics and Applications, IEEE Computer Society, pp. 77-81, 2014.*

"How Not to Be Seen—Object Removal from Videos of Crowded Scenes", Youtube, Retrieved on May 23, 2018, Webpage available at : https://www.youtube.com/watch?v=j3uCV0JYMJ4.

Extended European Search Report received for corresponding European Patent Application No. 15200926.2, dated Jun. 10, 2016, 10 pages.

Iwai et al., "Document Search Support by Making Physical Documents Transparent in Projection-Based Mixed Reality", Virtual Reality, vol. 15, No. 2-3, 2011, pp. 147-160.

Iwai et al., "Limpid Desk: See-Through Access to Disorderly Desktop in Projection-Based Mixed Reality", Proceedings of the ACM Symposium on Virtual Reality Software and Technology (VRST), Nov. 1-3, 2006, pp. 112-115.

International Search Report and Written Opinion received for corresponding Patent Cooperation Treaty Application No. PCT/FI2016/050879, dated Mar. 17, 2017, 15 pages.

Office action received for corresponding European Patent Application No. 15200926.2, dated Feb. 8, 2019, 5 pages.

Office action received for corresponding European Patent Application No. 15200926.2, dated Apr. 2, 2020, 5 pages.

Yoshida et al., "A Virtual Color Reconstruction System for Real Heritage with Light Projection", Proceedings of the International Conference on Virtual Systems and Multimedia, 2003, 7 pages.

Office Action for Indonesian Patent Application No. P00201804420 dated Aug. 10, 2020.

Office Action for Chinese Application No. 201680073318.X dated Apr. 25, 2021, 17 pages.

Office Action for Chinese Application No. 201680073318.X dated Jul. 30, 2021, 17 pages.

Office Action for Chinese Application No. 201680073318.X dated Oct. 11, 2021, 9 pages.

Decision to Grant for Chinese Application No. 201680073318.X dated Jan. 14, 2022, 4 pages.

Summons to Attend Oral Proceedings for European Application No. 15200926.2 dated Jun. 14, 2021, 6 pages.

Decision to Refuse for European Application No. 152000926.2 dated Feb. 22, 2022, 14 pages.

* cited by examiner

METHOD, APPARATUS OR COMPUTER PROGRAM FOR CONTROLLING IMAGE PROCESSING OF A CAPTURED IMAGE OF A SCENE TO ADAPT THE CAPTURED IMAGE

RELATED APPLICATION

This application was originally filed as Patent Cooperation Treaty Application No. PCT/FI2016/050879 filed Dec. 15, 2016 which claims priority benefit to European Patent Application No. 15200926.2, filed Dec. 17, 2015.

TECHNOLOGICAL FIELD

Embodiments of the present invention relate to a method, apparatus or computer program for controlling image processing of a captured image of a scene to adapt the captured image.

BACKGROUND

At present video capture generally involves capturing video over a narrow field of view and an operator is therefore required to direct the camera appropriately to record particular portions of a scene at particular times. An editor may edit the recorded video. The recorded video whether edited or not is then rendered to a viewer. What the viewer sees is limited by where the operator has directed the camera when.

If video were captured over a wider field of view by one or more cameras then direction or accurate direction of the camera(s) may not be required, however, it is possible that undesired parts of the scene will be recorded because of the wider field of view.

BRIEF SUMMARY

According to various, but not necessarily all, embodiments of the invention there is provided a method comprising: processing a recording of a scene to recognise a predetermined user command event performed within the scene; and automatically controlling image processing of a captured image of the scene to adapt the captured image, in dependence on said recognition of the predetermined user command event performed within the scene.

An apparatus comprising: at least one processor; and at least one memory including computer program code the at least one memory and the computer program code configured to, with the at least one processor, cause the apparatus at least to perform the method.

A computer program that, when run on a computer, performs the method.

An apparatus comprising means for performing the method.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which.

DETAILED DESCRIPTION

In general the following Figures illustrate examples of a method 200 comprising: processing 220 a recording 212 of a scene 10 to recognise a predetermined user command event 22 performed within the scene 10; and automatically controlling 222 image processing 230 of a captured image 214 of the scene 10 to adapt the captured image 214, in dependence on said recognition of the predetermined user command event 22.

Figure 1A:
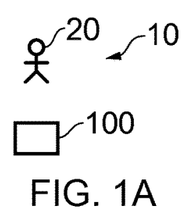
FIGS. 1A and 1B illustrate a scene, a camera apparatus recording an image of the scene, and a user performing a user command event in the recorded scene.
Figure 1B:
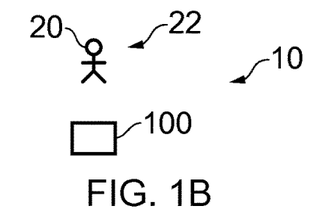

FIG. 1A illustrates a scene 10 at a first time t1 and FIG. 1B illustrates the scene 10 at a later second time t2. A camera apparatus 100 records an image of the scene 214. The camera apparatus 100 may, for example, record a single image, a series of images, or video of the scene 10.

The user 20 performs a user command event 22 at time t2 in FIG. 1B. In this example, the user 20 performs an action such as performing a gesture, however, in other examples the user 20 may speak or make a noise or noises. The term user command event 22 describes an event or events caused in the scene 10 by the user 20 for the purpose of issuing a command. The user command event 22 is predetermined in the sense that it has a defined form that can be recognized and, if necessary, disambiguated from other user command events 22.

Figure 2:
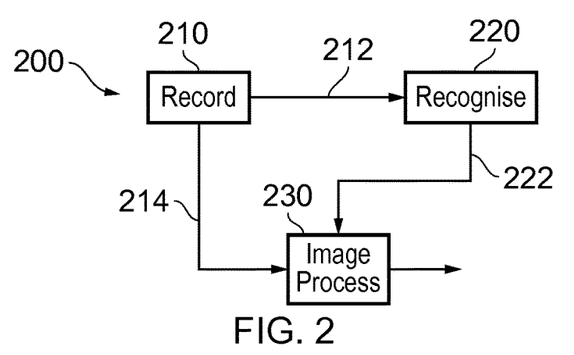
FIG. 2 illustrates an example of the method.

Referring to FIG. 2, an example of the method 200 is illustrated.

At block 210 a scene 10 is recorded to create a recording 212 of the scene 10.

At block 220, the recording 212 of the scene 10 is processed to recognise the predetermined user command event 22 performed within the scene 10 by the user 20.

Recognition may, in some examples, require a matching correspondence between a predetermined user command event 22 and a user command event 22 performed within the scene 10 by the user 20.

In some, but not necessarily all examples, recognition may additionally require recognition of the user 20 and/or aspects of the scene 10.

In some but not necessarily all examples, block 220, is capable of recognizing multiple different predetermined user command events 22 performed within the scene 10 by the user 20 and may be capable of disambiguating multiple different predetermined user command events 22.

Block 220, automatically controls 222, at block 230, image processing of a captured image 214 of the scene 10 to adapt the captured image 214, in dependence on said recognition of the predetermined user command event 22.

The captured image 214 may, for example, be a single captured image, a series of captured images, or video of the scene 10. The recording 212 of the scene 10 may be recorded by different cameras. The recording 212 of the scene 10 may be recorded from different positions, viewpoints, fields of view etc. The recording 212 may be a stitched panoramic image or video created by stitching together still images or videos from several cameras. The captured image 214 may, for example, be provided by block 210 which records the scene 10 to create the recording 212 of the scene 10.

Image processing 230 of a captured image 214 of the scene 10 to adapt the captured image 214, in dependence upon said recognition of the predetermined user command event 22, occurs at block 230.

Figure 3:
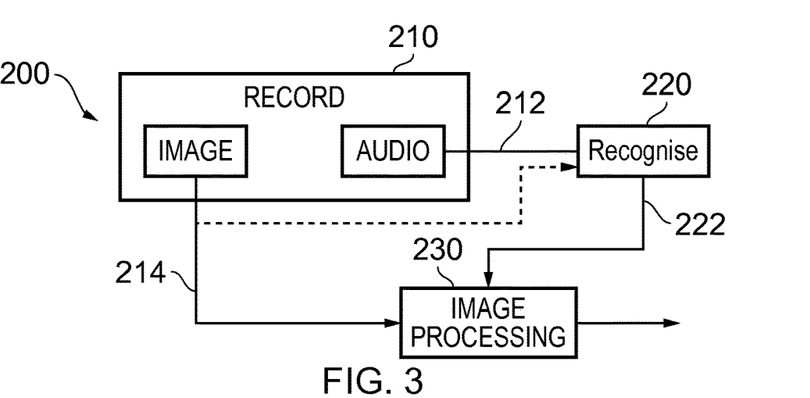
FIG. 3 illustrates an example of the method, where the recording used for recognition comprises audio.

In FIG. 3 example, recording 212 of the scene 10 made at block 210 comprises at least an audio recording of the scene 10. The recording 212 of the scene 10 may be recorded by different microphones.

At block 220, the recording 212 of the scene 10 is processed to recognise the predetermined user command event 22 performed within the scene 10 by the user 20.

The processing of the recording 212 of the scene 10 to recognise the predetermined user command event 22 performed within the scene 10 by the user 20, comprises at least audio analysis. Examples of suitable audio analysis may include speech recognition and/or spectral component analysis. Recognition may, in some examples, require a matching correspondence between a predetermined audio user command event 22 and an audio user command event 22 performed within the scene 10 by the user 20.

Figure 4:
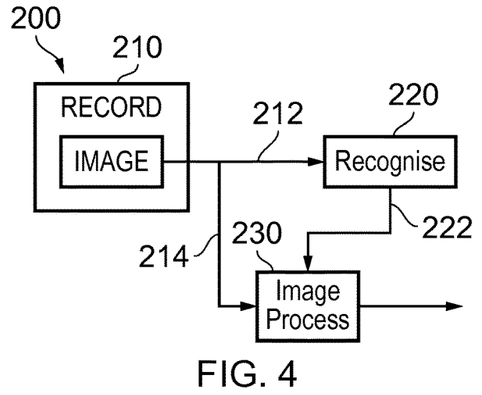
FIG. 4 illustrates an example of the method, where the recording used for recognition comprises at least one image.

In FIG. 4 example, recording 212 of the scene 10 made at block 210 comprises at least an image recording of the scene 10, for example, recording 212 of the scene 10 may be a single image, a series of images, or video of the scene 10. The image recording 212 of the scene 10 may be recorded by different cameras. The image recording 212 of the scene 10 may be recorded from different positions, viewpoints, fields of view. The image recording 212 may be a stitched panoramic image or video created by stitching together still images or videos from several cameras.

At block 220, the recording 212 of the scene 10 is processed to recognise the predetermined user command event 22 performed within the scene 10 by the user 20.

The processing of the recording 212 of the scene 10 to recognise the predetermined user command event 22 performed within the scene 10 by the user 20, may comprise image analysis. Examples of suitable image analysis may include computer vision analysis such as, for example, image feature extraction and pattern matching of extracted features or other approaches. Recognition may, in some examples, require a matching correspondence between a predetermined image user command event 22 and an image user command event 22 performed within the scene 10 by the user 20.

The captured image 214 may, for example, be provided by block 210. The image recording 212 of the scene 10 used for recognition may, in some but not necessarily all examples, also be used as the captured image 214 of the scene 10 adapted by processing at block 230. The captured image 214 may, for example, be a single captured image, a series of captured images, or video of the scene 10.

Referring to FIG. 3, in some but not necessarily all examples, the recording 212 of the scene 10 may additionally comprise an image recording of the scene 10, for example, recording 212 of the scene 10 may be a single image, a series of images, or video of the scene 10. Thus the recording 212 of the scene 10 may be an audio-visual recording.

The image recording of the scene 10 used for recognition, if any, may provide the captured image 214 of the scene 10 adapted by processing at block 230.

At block 220, the recording 212 of the scene 10 is processed to recognise the predetermined user command event 22 performed within the scene 10 by the user 20. The processing of the recording 212 of the scene 10 to recognise the predetermined user command event 22 performed within the scene 10 by the user 20, may additionally comprise image analysis, for example as described with reference to FIG. 4.

Referring to FIG. 4, in some but not necessarily all examples, the recording 212 of the scene 10 may additionally comprise an audio recording of the scene 10, for example, recording 212 of the scene 10 may be an audio-visual recording.

At block 220, the recording 212 of the scene 10 is processed to recognise the predetermined user command event 22 performed within the scene 10 by the user 20.

The processing of the recording 212 of the scene 10 to recognise the predetermined user command event 22 performed within the scene 10 by the user 20, may additionally comprise audio analysis, for example as described with reference to FIG. 3.

Referring to FIGS. 3 & 4, in some, but not necessarily all examples, recognition may additionally require recognition of the user 20 and/or aspects of the scene 10. Examples of suitable facial recognition analysis include, for example, facial feature extraction and principal component analysis.

Figure 5:
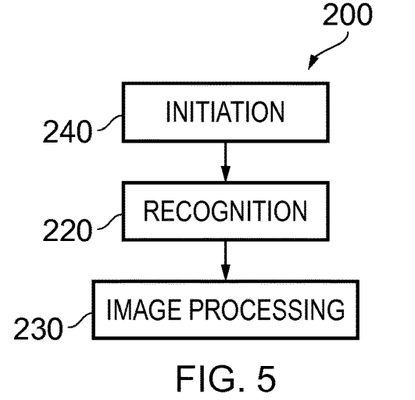
FIG. 5 illustrates an example of the method having an initiation stage.

FIG. 5 illustrates an example of the method 200.

Initially at block 240 a recording of a scene 10 is processed to recognise a user initiation event dependent upon proximal user event detection and/or user action recognition and/or user identity recognition.

The recording of the scene 10 may be an audio (only) recording, an image (only) recording or an audio-visual recording comprising an image and audio. An image recording may comprise a single image, a series of images, or video of the scene 10. The image recording of the scene 10 may be recorded by different cameras. The image recording of the scene 10 may be recorded from different positions, viewpoints, fields of view. The image recording may be a stitched panoramic image or video created by stitching together still images or videos from several cameras.

The term user initiation event describes an event or events caused in the scene 10 by the user 20 for the purpose of enabling the issuing one or more commands. The user initiation event may be predetermined in the sense that it has a defined form that can be recognized and, if necessary, disambiguated from other events.

Proximal user event detection requires determination of whether or not a detected event occurs within a distance threshold, for example, within a distance threshold of the camera apparatus 100.

A depth sensor may be used to detect a distance to a user 20.

User action recognition requires recognition of a detected event as a predetermined user action, for example, a predetermined action such as a gesture and/or sound etc performed by the user 20.

User identity recognition requires recognition of a detected event as performed by a particular user 20. It may for, example, use face recognition technology.

Then after recognition of the user initiation event the method 200 comprises, at block 220, processing a recording 212 of the scene 10 to recognise a predetermined user command event 22 performed within the scene 10.

Then at block 230, the method 200 comprises automatically controlling 222 image processing 230 of a captured image 214 of the scene 10 to adapt the captured image 214, in dependence on said recognition of the predetermined user command event 22.

Examples of image processing 230 of a captured image 214 of the scene 10 to adapt the captured image 214, in dependence on said recognition of the predetermined user command event 22, are explained in more detailed below with references to FIGS. 6 to 10.

The image processing, at block 230, of a captured image 214 of the scene 10 to adapt the captured image 214, in dependence on said recognition of the predetermined user command event 22, may comprise image processing 230 of multiple captured single images 214 of the scene 10 to adapt the multiple captured single images 214, in dependence on said recognition of the predetermined user command event 22.

The multiple captured single images 214 may be, for example, consecutive image frames of a video.

The multiple captured single images 214 of the scene 10 may have been captured before and/or during and/or after the recording 212 of the scene 10 used to recognise the predetermined user command event 22 performed within the scene 10.

One or more of the multiple captured images 214 of the scene 10 may have been used as at least part of the recording 212 of the scene 10 used to recognise the predetermined user command event 22 performed within the scene 10. Those images and the other images that together form the multiple captured single images 214 are adapted, in dependence on said recognition of the predetermined user command event 22.

The multiple images may represent a limited time period within a video.

The multiple captured single images 214 adapted, in dependence on said recognition of the predetermined user command event 22 may be for a contiguous segment of time within the video.

The limited time period may be adapted based on image processing. For example, it may only occur while there is a requirement for the image processing. For example, it may occur to mask a user 20 while the user 20 is making adjustments to the camera apparatus 100.

Transition effects may, for example, be provided at the beginning and end of the limited time period. For example, a fade-out may occur at the beginning and a fade-in may occur at the end. The timing of the fade-out and/or the fade-in may be determined by image analysis. For example, an object may only be faded out and/or faded-in if the object is currently outside an operational field of view i.e. only it is not rendered to a viewer.

The image processing may comprise removal and replacement of content from the captured image(s) 214 of the scene 10 to create an adapted captured image(s) of the scene 10.

Figure 6A:
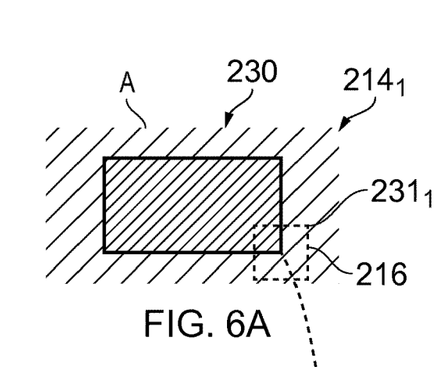
FIGS. 6A, 6B, 6C illustrate an example of how image processing is controlled to adapt a captured image.
Figure 6B:
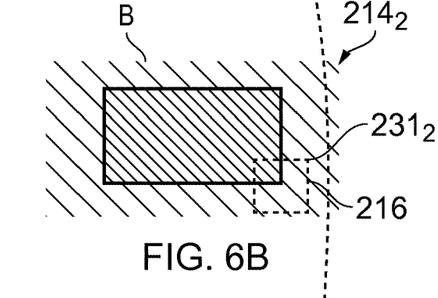
Figure 6C:
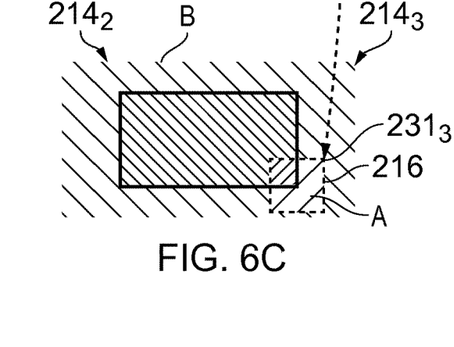

As illustrated in FIGS. 6A, 6B, 6C, automatically controlling image processing of a captured image 214 of the scene 10 to adapt the captured image 214, in dependence on said recognition of the predetermined user command event 22 performed within the scene 10 may, for example, comprise controlling processing of:

a first image $214_1$ of a scene 10 captured at a first time, where a particular portion $231_1$ of the scene 10 has a first state A (first content) in the captured first image $214_1$, and a second image $214_2$ of the scene 10 captured at a second time, where the particular portion $231_2$ of the scene, corresponding to the particular portion $231_1$ of the scene 10 in the captured first image $214_1$, has a second state B (second content) in the captured second image $214_2$, wherein the particular portion 231 of the scene 10 changes between the first state and the second state (different content), to generate a third image $214_3$, comprising the second image $214_2$ of the scene 10 adapted such that the particular portion $231_2$ of the second image $214_2$ has a first state A (first content) in the adapted captured second image $214_3$ and not the second state B (second content) of the second image $214_2$ of the scene 10.

The boundary 216 in the third image $214_3$ of the particular portion $231_3$ from the first image $214_1$ that has a first state A (first content) is blended with a circumscribing portion $231_2$ of the second image $214_2$ of the scene 10 that has the second state B so that the transition between the original second image $214_2$ and the replacement portion $231_1$ in the adapted second image $214_3$ from the corresponding portion $231_1$ of the first image $214_1$ is not visible, for example, to a human eye at normal resolution.

The third image $214_3$, comprises the second image $214_2$ of the scene 10 having a replacement image portion $231_3$ for the particular portion $231_2$ of the scene 10, the replacement image portion $231_3$ depending upon the corresponding particular portion $231_1$ of the scene captured in the first image $214_1$.

The method may enable user selection of the particular portion 231 or enable automatic selection of the particular portion 231.

For example, the predetermined user command event 22 performed within the scene 10 by the user 20 may define the particular portion 231. The predetermined user command event 22 may, for example, select and register an object for removal such as, for example, operators, equipment, the user 20 or the user 20 and any equipment the user 20 is carrying. Alternatively, the predetermined user command event 22 may, for example, select and register a portion of the scene 10 as static and not to be changed or updated in subsequent images. This creates a static region where equipment and operators can be located without appearing in the processed image.

For example, the predetermined user command event 22 performed within the scene 10 by the user 20 may define a criteria for automatic definition of the particular portion 231. For example, it may define that a new object entering the scene 10 is removed or that a new object entering the scene 10 at a particular point, for example through a particular door, is removed.

Figure 7A:
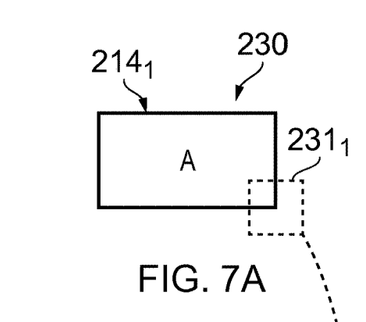
FIGS. 7A, 7B, 7C illustrate an example of how image processing is controlled to adapt a captured image to remove an object.
Figure 7B:
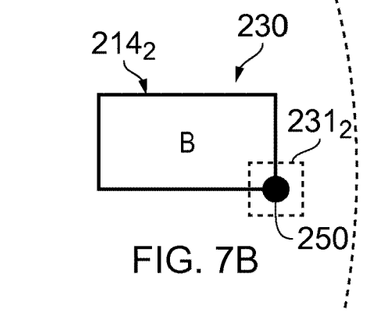
Figure 7C:
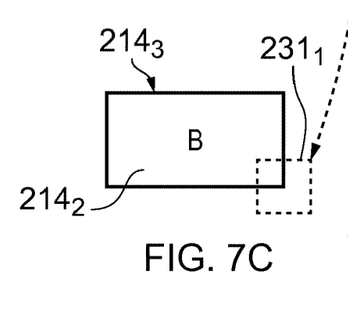

FIGS. 7A, 7B, 7C illustrates an example of image processing occurring at block 230. Automatically controlling image processing of a captured image 214 of the scene 10 to adapt the captured image 214, in dependence on said recognition of the predetermined user command event 22 performed within the scene 10 may, for example, comprise controlling processing of:

a first image $214_1$ of a scene 10 captured at a first time, where a particular portion $231_1$ of the scene 10 is not occluded (obscured)

a second image $214_2$ of the scene 10 captured at a second time, where the particular portion $231_2$ of the scene 10 is at least partially occluded (obscured), to generate a third image $214_3$, comprising the second image $214_2$ of the scene 10 adapted such that the at least partially occluded (obscured) portion $231_2$ of the scene 10 in the second image $214_2$ is replaced by the same portion $231_1$ of the scene 10 in the first image $214_1$ that is not occluded (obscured).

In this example, occlusion (obscuration) is caused by a foreground object 250. The processing at block 230 removes the object 250 from the second image $214_2$ of the scene 10.

The predetermined user command event 22 may indicate at least one of one or more objects 250 for removal. At least one of the objects 250 removed may be the user 20, at least while performing the user command event 22.

Figure 8A:
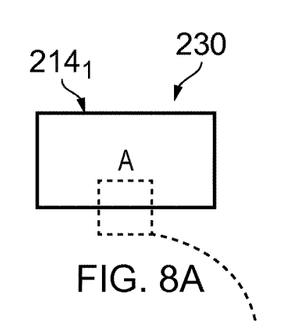
FIGS. 8A, 8B, 8C and FIGS. 8D, 8E, 8F illustrate an example of how image processing is controlled to adapt captured video to remove a moving object.
Figure 8B:
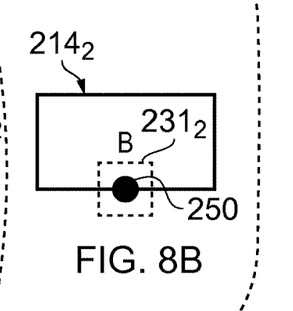
Figure 8C:
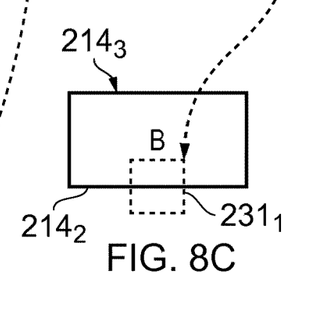
Figure 8D:
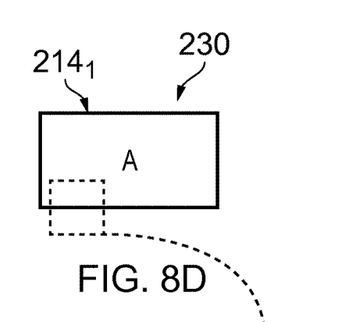
Figure 8E:
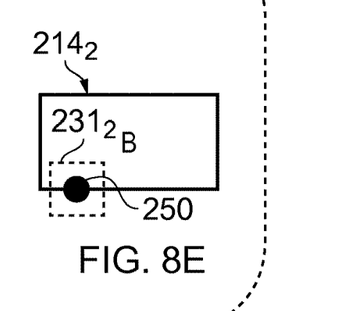
Figure 8F:
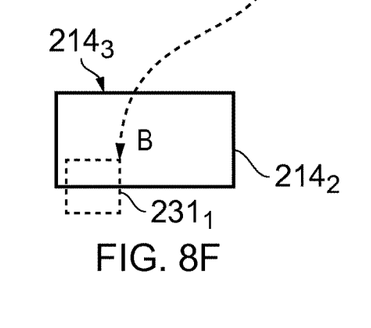

FIGS. 8A, 8B, 8C illustrate an example of image processing 230 occurring at block 230 for an image frame of a video. FIGS. 8A, 8B, 8C illustrate an example of image processing occurring at block 230 for the next image frame of a video. FIGS. 8D, 8E, 8F illustrate an example of image processing occurring at block 230 for the next image frame of a video. The method described in relation to FIGS. 7A, 7B, 7C is also applicable to FIGS. 8A, 8B, 8C and is also applicable to FIGS. 8D, 8E, 8F.

As illustrated in contiguous frames of video 7B, 8B, 8E, an object 250 moves through the scene 10 and is present in the second images $214_2$ of the scene 10 at different locations in FIGS. 7B, 8B, 8E.

As illustrated in the adapted contiguous frames of video 7C, 8C, 8F, the object 250 moving through the scene 10 has been removed, the relevant portion $231_2$ of the image replaced with a corresponding portion $231_1$ that does not comprise the object 250 from another image (FIGS. 7A, 8A, 8D).

The object 250 is tracked as it moves through the scene 10 and removed.

Figure 9A:
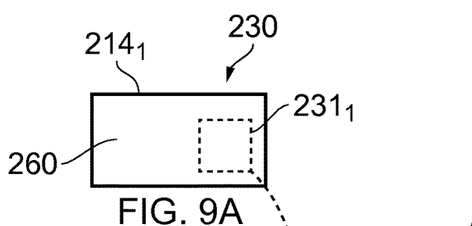
FIGS. 9A, 9B, 9C and FIGS. 9D, 9E, 9F illustrate an example of how image processing is controlled to adapt a captured image to keep part of the image unchanged.
Figure 9B:
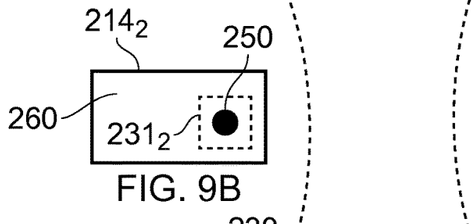
Figure 9C:
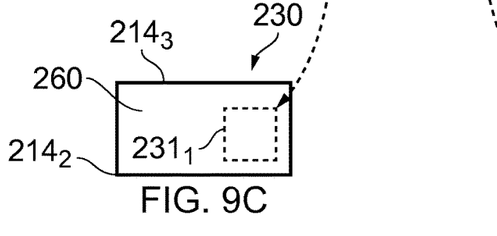

FIGS. 9A, 9B, 9C illustrate an alternative example of image processing 230 occurring at block 230. Automatically controlling image processing 230 of a captured image 214 of the scene 10 to adapt the captured image 214, in dependence on said recognition of the predetermined user command event 22 performed within the scene 10, at block 230, may, for example, comprise controlling processing of:

a first image $214_1$ of a scene 10, where a particular portion $231_1$ of the scene 10 has first content and a second image $214_2$ of the scene 10, where a particular portion $231_2$ of the scene 10, corresponding to the particular portion $231_1$ of the scene 10 in the first image $214_1$, has second content different to the first content, to generate a third image $214_3$, comprising the second image $214_2$ of the scene 10 adapted such that the particular portion $231_2$ of the scene 10 in the second image $214_2$ comprising second content is replaced by the same particular portion $231_1$ of the scene 10 in the first image $214_1$ comprising the first content. Thus the first content is static and does not change. The particular portion $231_1$ and its first content are protected from change in the processed image $214_3$, despite changing or being obscured in the captured image $214_2$ of the scene 10 by different objects 250 so long as the particular portion $231_1$ is within protected image region 260.

Figure 9D:
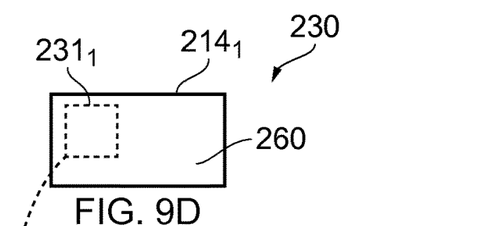
Figure 9E:
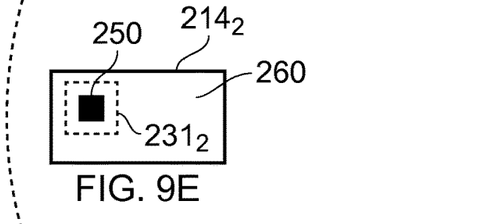
Figure 9F:
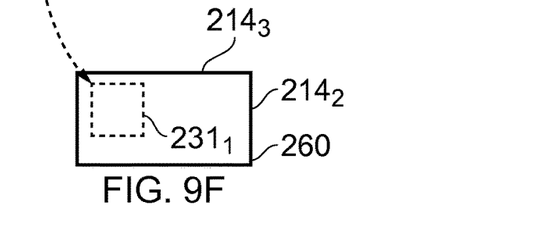

FIGS. 9D, 9E, 9F illustrate an alternative example of image processing 230 occurring at block 230. These figures are similar to FIGS. 9A, 9B, 9C and the method is similar. The figures have the same protected region 260 but differ in that the particular portion 231 is differently located and/or differently shaped in FIGS. 9D, 9E, 9F compared to FIGS. 9A, 9B, 9C because the objects 250 are differently sized and located in the second image $214_2$ (FIG. 9B) compared to the second image $214_2$ (FIG. 9E).

Figure 10A:
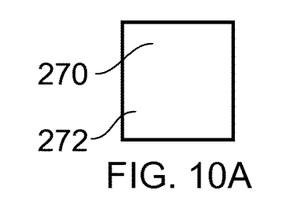
FIGS. 10A and 10B illustrate an example in which the predetermined user command event performed within the scene by the user defines a criteria for automatic definition of the part of the image that remains unchanged in FIGS. 9A-9F.
Figure 10B:
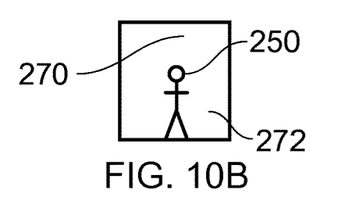

FIGS. 10A and 10B illustrate an example in which the predetermined user command event 22 performed within the scene 10 by the user 20 define a criteria for automatic definition of the particular portion 231.

In this example, it defines that a new object 250 entering the scene 10 at a particular point, for example through a particular door 272, is removed.

FIG. 10A illustrates an image $214_3$ of the scene 10 after processing at block 230 whether or not a person enters through the door 272.

FIG. 10B illustrates an image $214_2$ of the scene 10 as captured when a person enters through the door 272.

The method identifies when a person or object enters through the door 272, or other region or image boundary, and then tracks and removes that object as described with reference to FIGS. 8A-8F.

Figure 11:
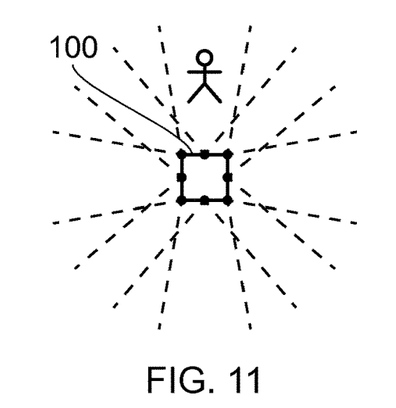
FIG. 11 illustrates an example of a camera apparatus 100.

FIG. 11 illustrates an example of a camera apparatus 100, for example as illustrated in FIG. 1A, 1B. In this example the camera apparatus 100 has multiple cameras 102 arranged with overlapping fields of view. The overlapping fields of view create an effective field of view greater than the field of view of one camera 102. The effective field of view may be greater than 100°, 120°, 180°, 270° and may even be 360° in relation to one or more orthogonal axes e.g. azimuthal and polar axes in a spherical coordinate system or x and y axes in a Cartesian coordinate system.

Each field of view of a camera 102 defines an image 214. The overlapping fields of view define a panoramic image 214 having the effective field of view.

In the foregoing description reference to an image 214 includes reference to a narrow field of view image and/or a wide/panoramic field of view image.

A wide/panoramic field of view image may be rendered in a mediated reality display device, for example, an augmented reality display device.

A wide/panoramic field of view image may be a series of images, for example from different cameras, which have not been combined (stitched) into a single image but which are interpreted as a panoramic image.

A wide/panoramic field of view image may be a series of images, for example from different cameras, which have been combined (stitched) into a single image.

The images in a series of images may be recorded from different positions, viewpoints, fields of view etc.

An image may be a single image, a series of images, or video.

An image may be a two dimensional image or a three dimensional image. In the case of three dimensional images, depth data analysis methods such as segmenting objects based on depth information, or recognizing humans/objects by analysing depth data may be used. The depth data may be obtained by analysing image data from a plurality of image sensors, or from a dedicated depth sensing device based on, for example, detecting a reflected projected Infra-red pattern using stereoscopic cameras.

Figure 12:
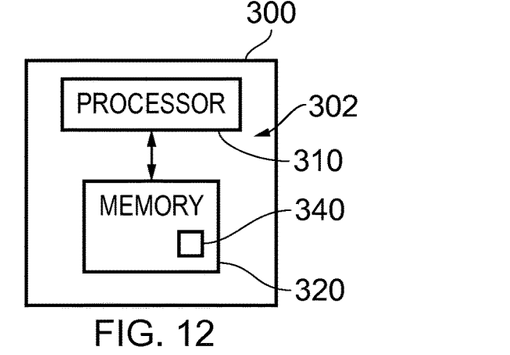
FIG. 12 illustrates an example of a controller suitable for performing the method or parts of the method.

FIG. 12 illustrates an example of a controller 302 suitable for performing the methods 100 and any one or more of the blocks 240, 220, 230 of the method 200.

Implementation of a controller 302 may be as controller circuitry. The controller 302 may be implemented in hardware alone, have certain aspects in software including firmware alone or can be a combination of hardware and software (including firmware).

As illustrated in FIG. 12 the controller 302 may be implemented using instructions that enable hardware functionality, for example, by using executable computer program instructions 340 in a general-purpose or special-purpose processor 310 that may be stored on a computer readable storage medium (disk, memory etc.) to be executed by such a processor 310.

The processor 310 is configured to read from and write to the memory 320. The processor 310 may also comprise an output interface via which data and/or commands are output by the processor 310 and an input interface via which data and/or commands are input to the processor 310.

The memory 320 stores a computer program 340 comprising computer program instructions (computer program code) that controls the operation of the apparatus 300 when loaded into the processor 310. The computer program instructions, of the computer program 340, provide the logic and routines that enables the apparatus 300 to perform the methods illustrated in FIGS. 1-11. The processor 310 by reading the memory 320 is able to load and execute the computer program 340.

The apparatus 300 therefore comprises:
at least one processor 310; and
at least one memory 320 including computer program code 340
the at least one memory 320 and the computer program code 340 configured to, with
the at least one processor 310, cause the apparatus 300 at least to perform:
processing a recording of a scene 10 to recognise a predetermined user command event 22 performed within the scene 10; and
automatically controlling image processing 230 of a captured image 214 of the scene 10 to adapt the captured image 214, in dependence on said recognition of the predetermined user command event 22 performed within the scene 10.

Figure 13:
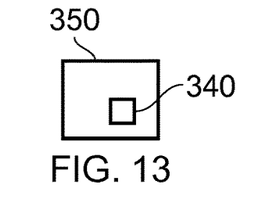
FIG. 13 illustrates an example of a data carrier.

As illustrated in FIG. 13, the computer program 340 may arrive at the apparatus 300 via any suitable delivery mechanism 350. The delivery mechanism 350 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 340. The delivery mechanism 350 may be a signal configured to reliably transfer the computer program 340. The apparatus 300 may propagate or transmit the computer program 340 as a computer data signal.

Although the memory 320 is illustrated as a single component/circuitry it may be implemented as one or more separate components/circuitry some or all of which may be integrated/removable and/or may provide permanent/semi-permanent/dynamic/cached storage.

Although the processor 310 is illustrated as a single component/circuitry it may be implemented as one or more separate components/circuitry some or all of which may be integrated/removable. The processor 310 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 1-11 may represent steps in a method 200 and/or sections of code in the computer program 340. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The apparatus 300 may comprise: means for processing a recording of a scene 10 to recognise a predetermined user command event 22 performed within the scene 10; and means for automatically controlling image processing 230 of a captured image 214 of the scene 10 to adapt the captured image 214, in dependence on said recognition of the predetermined user command event 22 performed within the scene 10.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   at least one processor; and
   at least one memory including computer program code,
   the at least one memory and the computer program code configured to, with the at least one processor, cause the apparatus to perform at least the following:
   process a recording of a scene to recognize a predetermined user command event performed within the scene;
      identify a moving object in the recording of the scene that is associated with the user command event;
      track the moving object in a sequence of frames of the recording of the scene; and
      control image processing of the recording of the scene, in dependence on said recognition of the user command event performed within the scene by removing the tracked moving object from the sequence of the frames of the recording of the scene and replacing the tracked moving object with different content.

2. An apparatus as claimed in claim 1, wherein processing the recording of the scene to recognize the predetermined user command event performed within the scene comprises image analysis of a recorded image of the scene to recognize the predetermined user command event performed within the scene.

3. An apparatus as claimed in claim 1, wherein processing the recording of the scene to recognize the predetermined user command event performed within the scene comprises gesture recognition of a person within the scene.

4. An apparatus as claimed in claim 1, wherein processing the recording of the scene to recognize the predetermined user command event performed within the scene occurs in response to at least one of (a) a user initiation event dependent upon proximal user event detection, (b) a user action recognition, or (c) a user identity recognition.

5. An apparatus as claimed in claim 1, wherein the predetermined user command event is not recognized in all of the frames in which the moving object is tracked.

6. An apparatus as claimed in claim 1, wherein controlling image processing of the recording of the scene comprises controlling processing of:
   a first image of the recording of the scene captured at a first time, where a portion of the scene has a first state in the captured first image, and
   a second image of the recording of the scene captured at a second time, where the portion of the scene has a second state in the captured second image,
   wherein the portion of the recording of the scene changes between the first state and the second state,
   to generate a third image, comprising the second image of the recording of the scene, adapted such that the portion of the second image has the first state in an adapted captured second image.

7. An apparatus as claimed in claim 6, wherein the third image, comprises the second image of the recording of the scene having a replacement image portion for the portion of the recording of the scene, the replacement image portion depending upon the portion of the recording of the scene captured in the first image.

8. An apparatus as claimed in claim 6, comprising enabling user selection of the portion or enabling automatic selection of the portion.

9. A method comprising:
   processing a recording of a scene to recognize a predetermined user command event performed within the scene;
   identifying a moving object in the recording of the scene that is associated with the predetermined user command event;
   tracking the moving object in a sequence of frames of the recording of the scene; and
   controlling image processing of the recording of the scene, in dependence on said recognition of the predetermined user command event performed within the scene by removing the tracked moving object from the sequence of frames of the recording of the scene and replacing the tracked moving object with different content.

10. A method as claimed in claim 9, wherein processing the recording of the scene to recognize the predetermined user command event performed within the scene comprises image analysis of a recorded image of the scene to recognize the predetermined user command event performed within the scene.

11. A method as claimed in claim 9, wherein processing the recording of the scene to recognize the predetermined user command event performed within the scene comprises gesture recognition of a person within the scene.

12. A method as claimed in claim 9, wherein processing the recording of the scene to recognize the predetermined user command event performed within the scene occurs in response to at least one of (a) a user initiation event dependent upon proximal user event detection, (b) a user action recognition, or (c) a user identity recognition.

13. A method as claimed in claim 9, wherein the predetermined user command event is not recognized in all of the sequence of the frames in which the moving object is tracked.

14. At least one non-transitory computer readable medium comprising instructions that, when executed, perform at least the following:
  process a recording of a scene to recognize a predetermined user command event performed within the scene;
  identify a moving object in the recording of the scene that is associated with the predetermined user command event;
  track the moving object in a sequence of frames of the recording of the scene; and
  control image processing of the recording of the scene, in dependence on said recognition of the predetermined user command event performed within the scene by removing the tracked moving object from the sequence of the frames of the recording of the scene and replacing the tracked moving object with different content.

15. The apparatus as claimed in claim 1, wherein the moving object is a person performing or having performed the user command.

16. The method as claimed in claim 9, wherein the moving object is a person performing or having performed the user command.

17. The non-transitory computer readable medium as claimed in claim 14, wherein the moving object is a person performing or having performed the user command.

* * * * *